US012782789B2

(12) United States Patent
Solgaard et al.

(10) Patent No.: US 12,782,789 B2
(45) Date of Patent: Nov. 3, 2026

(54) MIRROR-ENHANCED MEMS-BASED SPATIAL LIGHT MODULATOR

(71) Applicant: Silicon Light Machines Corporation, San Jose, CA (US)

(72) Inventors: Olav Solgaard, Stanford, CA (US); Stephen Sanborn Hamann, Sunnyvale, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 713 days.

(21) Appl. No.: 18/164,092

(22) Filed: Feb. 3, 2023

(65) Prior Publication Data

US 2023/0251548 A1 Aug. 10, 2023

Related U.S. Application Data

(60) Provisional application No. 63/306,835, filed on Feb. 4, 2022.

(51) Int. Cl.
*G02F 1/29* (2006.01)
*G01S 7/481* (2006.01)

(52) U.S. Cl.
CPC ............ *G02F 1/292* (2013.01); *G01S 7/4817* (2013.01); *G02F 2203/05* (2013.01); *G02F 2203/12* (2013.01)

(58) Field of Classification Search
CPC .. G02F 1/292; G02F 2203/05; G02F 2203/12; G02F 1/29; G01S 7/4817; G01S 17/42; G01S 17/89; G01S 17/931; G01S 7/481
USPC ..................... 359/221.2, 221.3, 222.1, 223.1
See application file for complete search history.

(56) References Cited

U.S. PATENT DOCUMENTS

| | | | | |
|---|---|---|---|---|
| 10,574,954 | B2 | 2/2020 | Hashimoto et al. | |
| 10,746,983 | B2 | 8/2020 | Payne et al. | |
| 2005/0018259 | A1* | 1/2005 | Holmes ................ | G02B 6/3556 359/3 |
| 2008/0100890 | A1* | 5/2008 | Curtis .................... | G03H 1/265 359/30 |
| 2011/0234951 | A1* | 9/2011 | Cohen ................ | G02B 6/29311 349/113 |
| 2018/0052276 | A1* | 2/2018 | Klienman ............ | G02B 5/1857 |

(Continued)

FOREIGN PATENT DOCUMENTS

CN 102226848 A * 10/2011

OTHER PUBLICATIONS

English translation of CN102226848, (2011) (Year: Oct. 26, 2011).*

(Continued)

*Primary Examiner* — William R Alexander
*Assistant Examiner* — Kuei-Jen L Edenfield
(74) *Attorney, Agent, or Firm* — Beyer Law Group LLP

(57) ABSTRACT

A micromechanical systems (MEMS)-based spatial light modulator (SLM) incorporates a mirror to increase the travel path of light. Light incoming to the MEMS-based SLM is incident on a modulation element of a phased-array. The modulation element reflects the light to a mirror, which reflects the light back to the modulation element. The modulation element reflects the light reflected off the mirror out of the MEMS-based SLM. A dispersive element allows the light to be steered by changing a wavelength of the light.

6 Claims, 11 Drawing Sheets

(56) References Cited

U.S. PATENT DOCUMENTS

| | | | | |
|---|---|---|---|---|
| 2018/0299664 | A1* | 10/2018 | Payne | G02B 26/10 |
| 2021/0041712 | A1* | 2/2021 | Bilik | G02F 1/292 |
| 2021/0072531 | A1 | 3/2021 | Ashida et al. | |
| 2022/0191440 | A1* | 6/2022 | Pertierra | G02B 27/46 |
| 2022/0252866 | A1 | 8/2022 | Payne et al. | |
| 2022/0260687 | A1 | 8/2022 | Hamann et al. | |

OTHER PUBLICATIONS

Landry, Joseph R. "Random Access Cylindrical Lensing and Beam Steering Using a High-Speed Linear Phased Array", IEEE Photonics Technology Letters vol. 32, No. Jul. 14, 15, 2020, pp. 859-862.

Pulikkaseril, Cibby, "RMCW LiDar", Baraja, https://www.baraja.com/en/blog/rmcw-lidar, Jul. 29, 2022, copyright 2015 Baraja Pty Ltd.

"Spectrum HD25", Baraja, https://www.baraja.com/en/spectrum-hd25, downloaded Jan. 6, 2023, copyright 2015 Baraja Pty Ltd.

"White Paper", Baraja, https://www.baraja.com/en/technology/white-paper, downloaded Jan. 6, 2023, copyright 2015 Baraja Pty Ltd.

Lize, Yannick, "Spectrum-Scan™ LIDAR: Next-generation technology for future of Autonomous Vehicles", Jan. 24, 2022, Baraja, copyright 2015 Baraja Pty Ltd.

* cited by examiner

MIRROR-ENHANCED MEMS-BASED SPATIAL LIGHT MODULATOR

CROSS-REFERENCE TO RELATED APPLICATION

This application claims the benefit of U.S. Provisional Application No. 63/306,835, filed on Feb. 4, 2022, which is incorporated herein by reference in its entirety.

TECHNICAL FIELD

The present disclosure is directed to microelectromechanical systems (MEMS)-based spatial light modulators.

BACKGROUND

A MEMS-based spatial light modulator (SLM) may be employed in a wide variety of applications including those that involve steering light toward a particular direction. An example MEMS-based SLM that may be employed to steer light is the Grating Light Valve (GLV®) device, which is commercially-available from Silicon Light Machines, Inc. The GLV® device is a well-known ribbon-type SLM. Briefly, a ribbon-type SLM may be arranged as a linear phased-array comprising a plurality of ribbons that are employed as modulation elements. A ribbon includes a reflective surface that may be actuated to deflect vertically through a gap or cavity toward a substrate when a voltage is applied between an electrode in the ribbon and a base electrode formed in or on the substrate. The ribbons are capable of being addressed individually for actuation. Steering is achieved by actuating the ribbons to reflect or diffract light incident thereon.

Another example MEMS-based SLM for steering light is the Planar Light Valve device, which is also a well-known device commercially-available from Silicon Light Machines, Inc. The Planar Light Valve device, which comprises a two-dimensional array of pixel elements, is a two-dimensional (2-D) equivalent of the one-dimensional GLV® device. The 2-D pixel arrangement enables larger pixel counts for continued throughput enhancement. U.S. Pat. No. 10,574,954 B2 discloses use of MEMS-based SLMs in a scanning system.

Light Detection and Ranging (LIDAR) systems are widely used in a number of different applications including automotive, robotics, and unmanned or autonomous vehicles for mapping, object detection and identification, and navigation. Generally, LIDAR systems work by illuminating a target in a far field scene with a light beam from a coherent light source, typically a laser, and detecting the light returning from the far field scene with a detector. Differences in light return times and wavelengths are analyzed in the LIDAR system to measure a distance to the target, and, in some applications, to render a digital three-dimensional (3-D) representation of the target.

The most common method of steering a laser to scan a target environment in a LIDAR system is by mechanical mirrors. However, these mirrors are relatively slow, expensive, and fragile. An alternate method utilizes a ribbon-type SLM, which allows for relatively fast operating speed and robustness. An added benefit is that the ribbon-type SLM enables random-access pointing, which allows for pointing at a location within a point of view without having to scan across unwanted areas. The use of a ribbon-type SLM for LIDAR applications is disclosed in U.S. Patent Publication No. 2021/0072531 A1 by Yuki Ashida et al.

Embodiments of the present invention disclose a novel optical configuration that improves the performance of MEMS-based SLMs in LIDAR and other applications that involve steering incident light that has a relatively long wavelength.

BRIEF SUMMARY

In one embodiment, a method of steering light includes receiving the light in a MEMS-based SLM. The light is incident on a reflective layer of a modulation element of a phased-array of the MEMS-based SLM, the reflective layer being suspended over a gap. The modulation element is electrostatically actuated to deflect the reflective layer vertically through the gap and reflect the light toward a mirror. The light is reflected off the mirror and back toward the modulation element. The light reflected off the mirror is reflected by the modulation element out of the MEMS-based SLM.

In another embodiment, a MEMS-based SLM comprises a phased-array and a mirror. The phased-array comprising a plurality of modulation elements that are electrostatically addressable to deflect reflective layers of the modulation elements vertically through a gap between the reflective layers and a substrate. The mirror is fixedly attached and faces the phased-array. The mirror is positioned to reflect light that is reflected off the modulation elements back toward the modulation elements.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. The figures are not drawn to scale.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
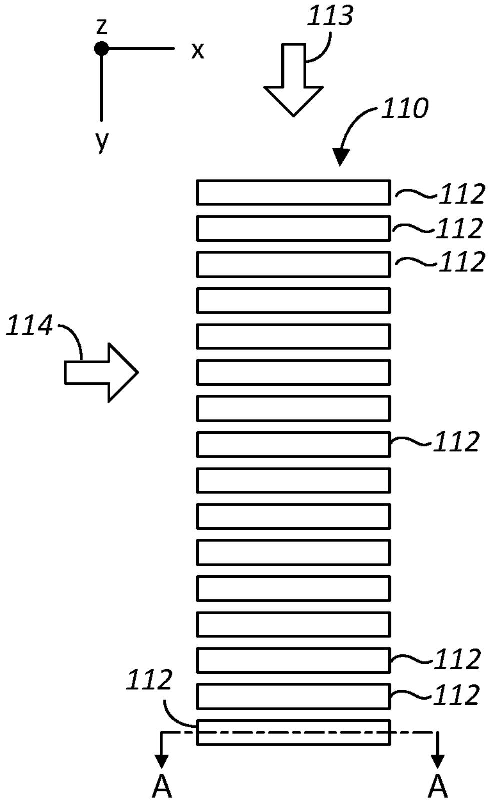
FIG. 1 is a schematic top view of a linear phased-array in accordance with an embodiment of the present invention.

FIG. 1 is a schematic top view of a linear phased-array 110 in accordance with an embodiment of the present invention. In one embodiment, the phased-array 110 is part of a MEMS-based SLM, such as the Grating Light Valve (GLV®) device commercially-available from Silicon Light Machines, Inc. As can be appreciated, embodiments of the present invention are equally applicable to other types of MEMS-based SLMs. For example, embodiments of the present invention may be adapted to planar-type SLMs, such as the Planar Light Valve device commercially-available from Silicon Light Machines, Inc.

The phased-array 110 comprises a plurality of modulation elements, which in the example of FIG. 1 are a plurality of addressable electrostatically actuated ribbons 112. The phased-array 110 may have thousands of ribbons 112 but only a few are shown and labeled for clarity of illustration. It is to be noted that the ribbons 112 may be arranged and controlled in groups, and one or more ribbons 112 in a group may be in a fixed position (i.e., not movable) relative to other ribbons 112 in the group.

The ribbons 112 are driven by control circuits (not shown), which may be integrally formed on the same substrate with the phased-array 110. The long axis of a ribbon 112 is depicted as being along the x-axis, and an axis of the phased-array 110 is depicted as being along the y-axis. The ribbons 112 move vertically up and down along the z-axis. The long axis of ribbon view is as seen in the direction of arrow 113, and the phased-array axis view is as seen in the direction of arrow 114. As will be more apparent below, in one embodiment, the phased-array 110 is employed in conjunction with a mirror (e.g., FIG. 6, 310) and/or a dispersive element (e.g., FIG. 9, 410).

Figure 2:
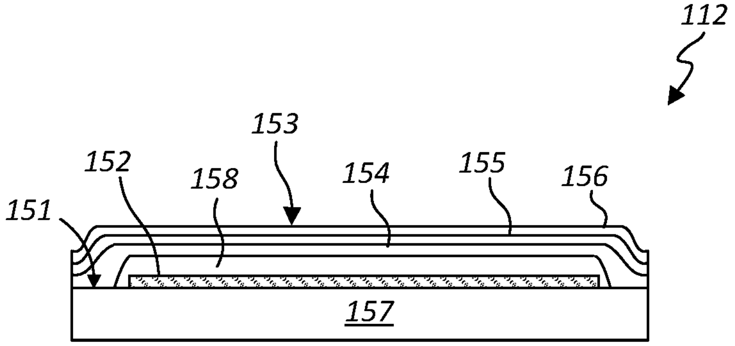
FIG. 2 is a schematic cross-sectional view of a ribbon taken along section A-A of FIG. 1.

FIG. 2 is a schematic cross-sectional view of a ribbon 112 taken along section A-A of FIG. 1. In the example of FIG. 2, a ribbon 112 includes a reflective layer 156 that has a reflective surface 153. An elastic mechanical layer 154 supports the reflective layer 156 above the surface 151 of a substrate 157. An electrode 155 is deflectable through a gap or cavity 158 toward the substrate 157 by electrostatic forces generated when a voltage is applied between the electrode 155 and a base electrode 152 formed in or on the substrate 157.

Generally, the mechanical layer 154 may comprise a taut silicon-nitride film (SiNx), and flexibly supported above the surface 151 of the substrate 157 by a number of posts or structures, typically also made of SiNx, at both ends of the ribbon 112. The reflective layer 156 may comprise any suitable metallic, dielectric or semiconducting material compatible with standard MEMS fabrication technologies, and capable of being patterned using standard lithographic techniques to form the reflective surface 153. The electrode 155, which is an electrically conducting layer, may be formed over and in direct physical contact with the mechanical layer 154, as shown, or underneath the mechanical layer 154. The electrode 155 may be a conducting or semiconducting material compatible with standard MEMS fabrication technologies. For example, the electrode 155 may comprise a doped polycrystalline silicon layer or a metal layer. Alternatively, if the reflective layer 156 is metallic, the reflective layer 156 may also serve as the electrode 155.

Figure 3:
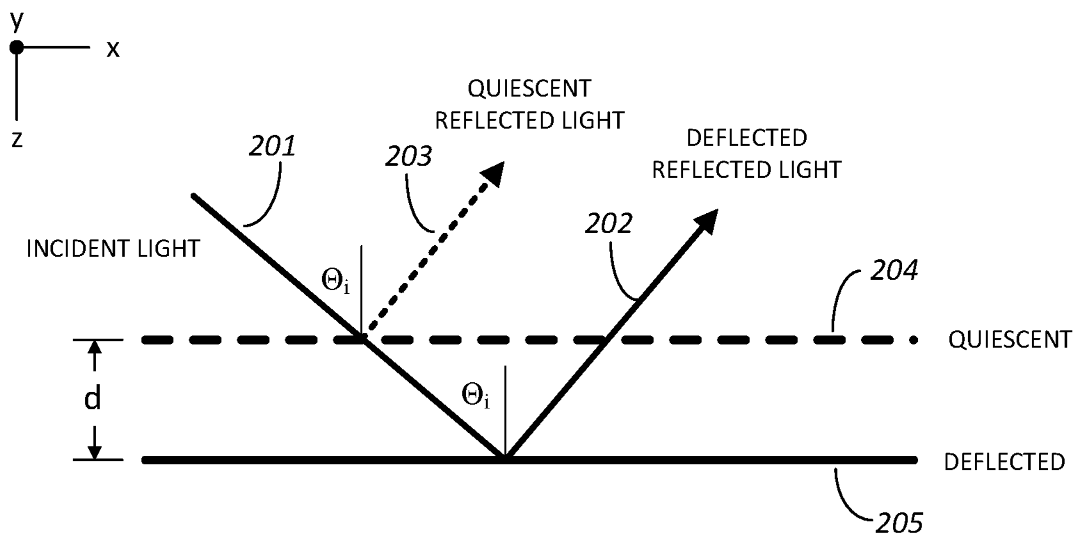
FIG. 3 is a schematic long axis of ribbon view that illustrates a general operation of a linear phased-array of a ribbon-type SLM.

FIG. 3 is a schematic long axis of ribbon view that illustrates a general operation of a linear phased-array of a ribbon-type SLM. In the example of FIG. 3, a dashed line 204 represents a ribbon in quiescent state (i.e., undeflected), whereas a solid line 205 represents the ribbon in deflected state. An applied voltage causes the ribbon to be pulled down a distance d from its quiescent state. Incoming light (FIG. 3, 201) of wavelength λ at an incident angle $\theta_i$ to the perpendicular of the ribbon travels farther when the incoming light is incident on a deflected ribbon (FIG. 3, 205) versus on a quiescent ribbon (FIG. 3, 204). Accordingly, there is a phase delay between outgoing light (FIG. 3, 203) reflected off a quiescent ribbon and outgoing light (FIG. 3, 202) reflected off a deflected ribbon. The phase difference $\Delta\emptyset$ caused by the phase delay is, $$\Delta\emptyset = \frac{2\pi}{\lambda} * 2d\cos\theta_i$$

where λ is the wavelength of the incident light source, d is the distance between the quiescent ribbon and the deflected ribbon (also referred to as "stroke"), and $\theta_i$ is the incident angle of the incident light relative to the perpendicular of the ribbon. It is to be noted that this phase difference is greatest at normal incidence (i.e., $\theta_i=0$). The maximum stroke for phase operation is one half wavelength over the cosine of the incident angle, which creates a 2π phase delay. Going further results in "phase wrap," meaning that modulation with 2π phase delay is effectively indistinguishable from modulation with a modulo 2π phase delay. For example, a ribbon deflected a distance 3λ/4 will have the same response as a ribbon deflected a distance λ/4 for a normal incident light source.

Figure 4:
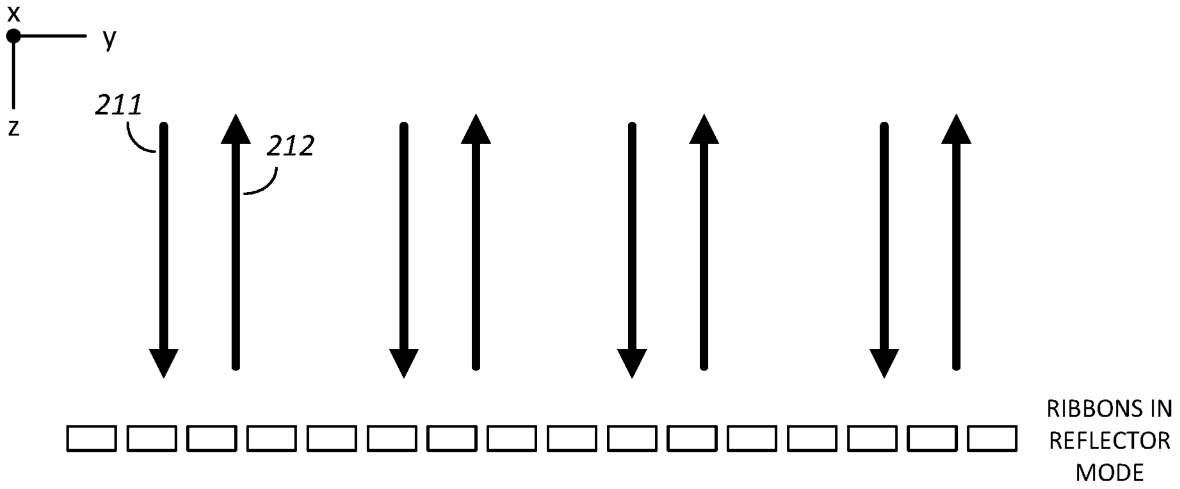
FIGS. 4 and 5 are schematic phased-array axis views that further illustrate a general operation of a linear phased-array of a ribbon-type SLM.
Figure 5:
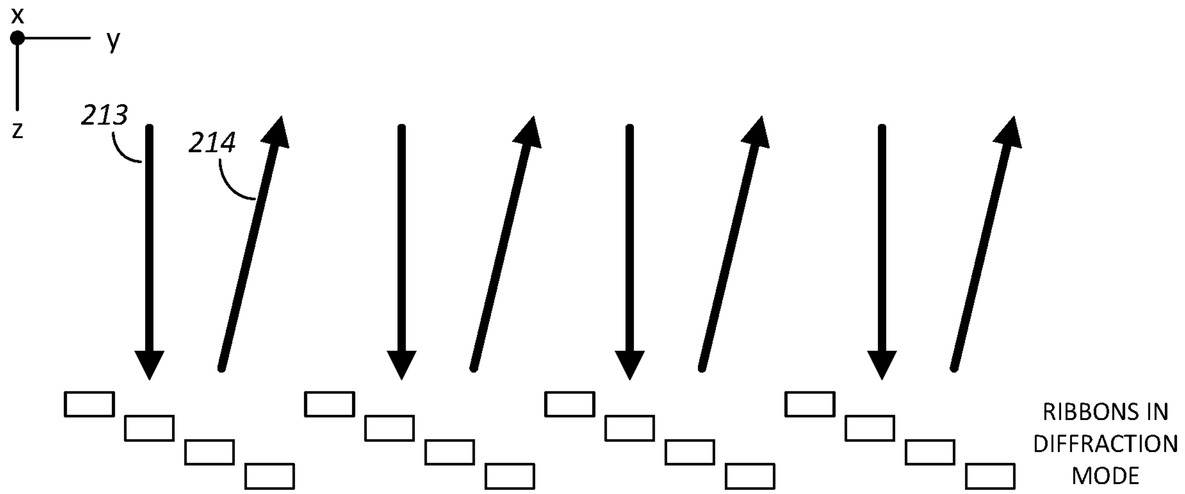

FIGS. 4 and 5 are schematic phased-array axis views that further illustrate a general operation of a linear phased-array of a ribbon-type SLM. Modulation elements, such as ribbons, may be operated in groups of two or more. FIGS. 4 and 5 show ribbons operating in groups of four for illustration purposes.

A ribbon-type SLM operates as a reflector when all of the ribbons are in quiescent state and as a diffraction grating when the ribbons are in varying levels of deflection. That is, a group of ribbons may operate in reflector mode or diffraction mode. A group of ribbons operate in reflector mode when all of the ribbons in the group are at the same distance relative to the surface of the substrate, such as when all of the ribbons in the group are in the quiescent state. FIG. 4 shows the groups of ribbons in reflector mode. In the reflector mode, incoming light (see FIG. 4, 211) incident on the ribbons is reflected back toward the light source (see FIG. 4, 212).

A group of ribbons operate in diffraction mode when the ribbons in the group are at varying distances relative to the surface of the substrate. One or more ribbons may be separately addressable to deflect a certain distance from the surface of the substrate in accordance with various control techniques to meet the needs of a particular application. FIG. 4 shows groups of ribbons in diffraction mode. In diffraction mode, incoming light (see FIG. 5, 213) incident on the ribbons is diffracted, thereby changing the angle of the outgoing light (see FIG. 5, 214).

Because the maximum stroke is proportional to wavelength, MEMS-bases SLMs that are designed for longer wavelength light sources, such as near infrared (NIE) lasers typically used for time of flight (TOF) and frequency-modulated continuous-wave (FMCW) LIDAR, require longer strokes than MEMS-bases SLMs used in visible light imaging applications. Increasing the stroke of the ribbons make them more difficult to manufacture and can negatively affect their performance. Therefore, it is desirable to decrease the required stroke while retaining the ability for 2π operation at longer wavelengths. In one embodiment, modulation elements of a MEMS-based SLM are employed in conjunction with a mirror to advantageously allow for operation at longer wavelengths without having to necessarily increase the required stroke. A further advantage is that the mirror enhancement may be applied on currently-existing MEMS-based SLMs, including ribbon-type and planar-type SLMs.

Figure 6:
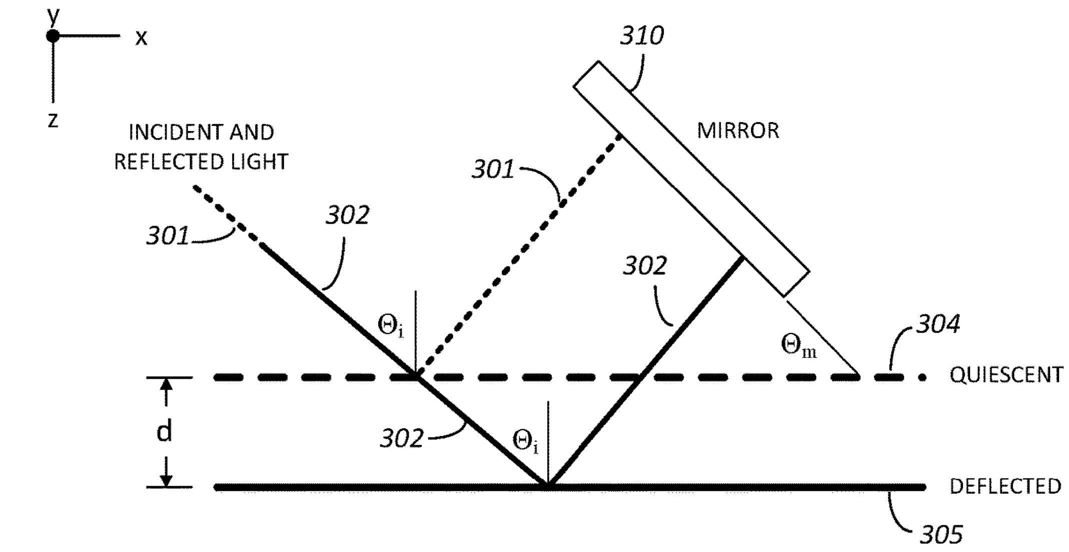
FIG. 6 is a schematic long axis of ribbon view that illustrates a general operation of the linear phased-array of FIG. 1 with mirror enhancement in accordance with an embodiment of the present invention.

FIG. 6 is a schematic long axis of ribbon view that illustrates a general operation of the phased-array 110 with mirror enhancement in accordance with an embodiment of the present invention. In the example of FIG. 6, the phased-array 110 operates to steer light in conjunction with a flat mirror 310. The flat mirror 310 is fixedly attached (i.e., does not move) in the MEMS-based SLM and is positioned to receive light from the phased-array 110. The flat mirror 310 is shown as operating with a single ribbon 112 for clarity of illustration. In practice, the flat mirror 310 may operate with two or more (e.g., all) of the ribbons 112 of the phased-array 110.

In the example of FIG. 6, light comes in and out of the SLM along the same path. More particularly, light incident on a quiescent ribbon (FIG. 6, 304) propagates to a flat mirror 310, and reflects off the flat mirror 310 back to the same quiescent ribbon (see FIG. 6, 301) to exit the SLM. Similarly, light incident on a deflected ribbon (FIG. 6, 305) propagates to the flat mirror 310, and reflects off the flat mirror 310 back to the same deflected ribbon (see FIG. 6, 302) to exit the SLM.

As can be seen from FIG. 6, by reflecting light back onto the same ribbon using a mirror, the effective path difference between a quiescent ribbon and a deflected ribbon is increased. For an incident angle $\theta_i$ to the perpendicular of the ribbon, a flat mirror at a mirror angle $\theta_m=\theta_i$ to the parallel of the long axis of the ribbon will reflect a light ray directly back onto the ribbon as in FIG. 6. In this case, the path length difference between a deflected ribbon and a quiescent ribbon will result in a phase difference, $$\Delta\phi = \frac{2\pi}{\lambda} * \frac{2ci}{\cos\theta_i},$$

meaning that the phase modulation is now increased rather than decreased by the incident angle of light as $\cos\theta_i<1$.

Figure 7:
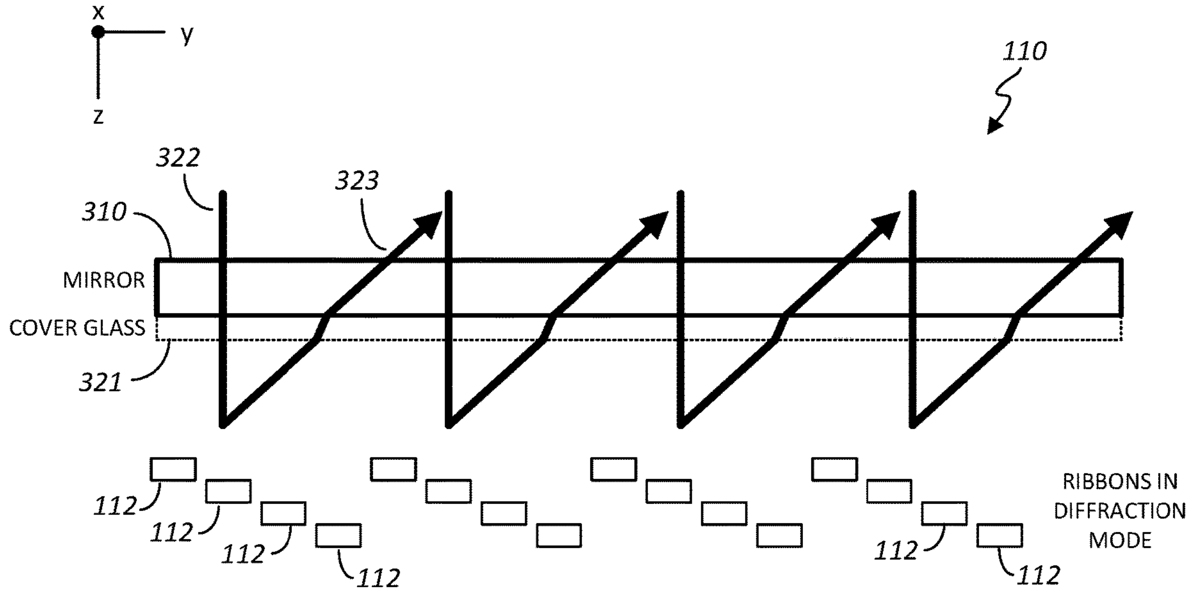
FIG. 7 is a schematic phased-array axis view of the linear phased-array of FIG. 1 with mirror-enhancement in accordance with an embodiment of the present invention.

FIG. 7 is a schematic phased-array axis view of the phased-array 110 with mirror-enhancement in accordance with an embodiment of the present invention. FIG. 7 shows groups of ribbons 112 in diffraction mode. In the example of FIG. 7, incoming light (FIG. 7, 322) is incident on the ribbons 112 as previously explained. The flat mirror 310 is positioned in an optical path past the linear phased-array 110. The SLM that includes the phased-array 110 and flat mirror 310 may further include a cover glass 321 for environmental protection. The cover glass 321 may be selected so as not to appreciably affect the optical path of the incoming light (FIG. 7, 322) and outgoing light (FIG. 7, 323). As can be appreciated, the flat mirror 310 does not change the steering action of the ribbons 112.

FIG. 6 shows a case where the mirror angle is equal to the incident angle (i.e., $\theta_m=\theta_i$). When the mirror and incident angles are different (i.e., $\theta_m\neq\theta_i$), the incoming light and outgoing light will be separated as shown in FIG. 8.

Figure 8:
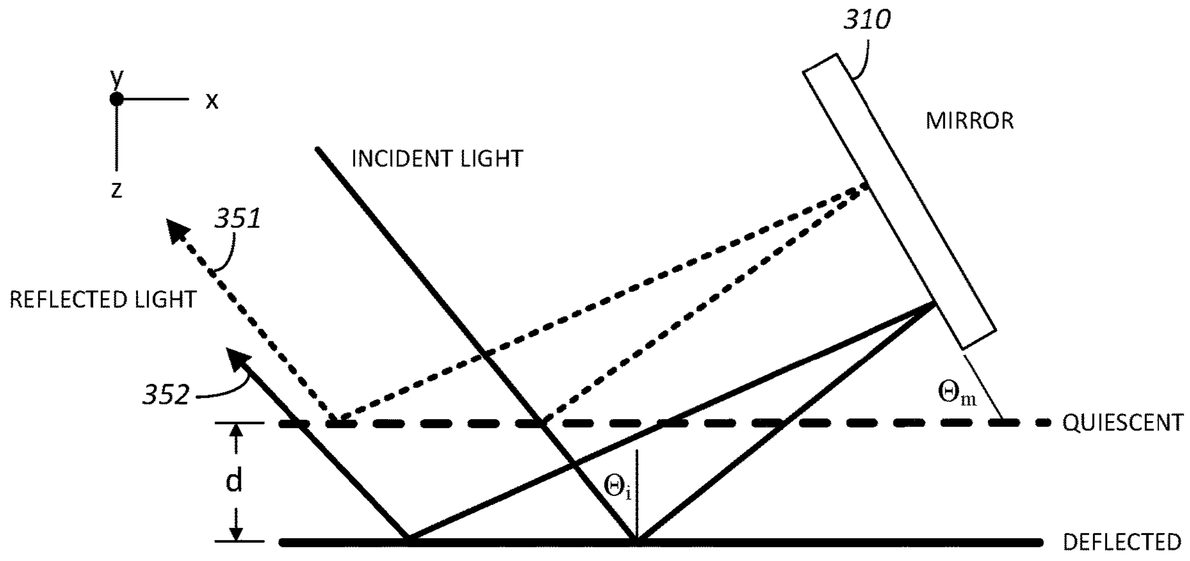
FIG. 8 is a schematic long axis of ribbon view that illustrates a general operation of the linear phased-array of FIG. 1 with mirror enhancement in accordance with an embodiment of the present invention.

FIG. 8 is a schematic long axis of ribbon view that illustrates a general operation of the phased-array 110 with mirror enhancement in accordance with an embodiment of the present invention. In the example of FIG. 8, the mirror angle $\theta_m$ is different from the incident angle $\theta_i$. This mirror configuration advantageously separates the incoming and outgoing light rays while increasing the phase modulation. Generally, it is preferable for the mirror angle to be greater than the incident angle.

In the example of FIG. 8, outgoing light comes out of the SLM along a path that depends on the state of the ribbons. More particularly, light incident on a quiescent ribbon propagates to the flat mirror 310, and reflects off the flat mirror 310 back to the same quiescent ribbon to exit the SLM along a first path (see FIG. 8, 351). However, light incident on the deflected ribbon propagates to the flat mirror 310, and reflects off the flat mirror 310 back to the same deflected ribbon to exit the SLM along a second path that is different from the first path (see FIG. 8, 352). Having different mirror and incident angles does not change the phased-array axis, and therefore does not affect the steering action of the ribbons as in FIG. 7.

The mirror may be placed at any point past the ribbons along the optical path of the SLM so long as suitable optics are used to image the light back onto the original ribbons, i.e., the same ribbons that reflect the light to the mirror. The mirror may be incorporated as part of the glass enclosure that is used to seal the SLM. Placing the mirror as close as possible to the ribbon surface ensures minimal loss from double pass effects on the grating structure but requires careful engineering so as the angled and extended aperture does not cause shadowing. Additionally, if the mirror is angled such that incoming and outgoing light are separated, the mirrored surface should be close enough to the ribbon surface such that the mirror-reflected light is incident on an active area of the ribbon.

Phased-array steering may be performed by applying a linear ramp signal to the ribbons, wrapping every 2π phase. The maximum angle is determined by the first order of the grating pitch of the ribbons, and the field of view is defined as the angle between the positive and negative first orders. Additionally, the ribbons can be used for focal scanning along the optical axis by applying a cylindrical phase profile. Full descriptions and analyses of these methods of operation are available in literature, e.g., J. R. Landry, S. S. Hamann and O. Solgaard, "Random Access Cylindrical Lensing and Beam Steering Using a High-Speed Linear Phased Array," in *IEEE Photonics Technology Letters*, vol. 32, no. 14, pp. 859-862, 15 Jul. 15, 2020, doi: 10.1109/LPT.2020.3000614.

A MEMS-based SLM may be used to scan a line beam in two dimensions: perpendicular to the line and along the optical axis. For spot scanned or point cloud systems, such as in LIDAR systems, it is desirable to have another orthogonal steered axis. One way of achieving secondary steering is by using a broadband or wavelength tunable laser together with a dispersive element, such as a prism. The dispersive element will separate the colors of a broadband source along the secondary axis, which can then be interrogated by separate detectors with narrow wavelength filters. Alternatively, the dispersive element will allow for orthogonal steering by changing the angle of an outgoing collimated light based on wavelength of a tunable laser source.

Figure 9:
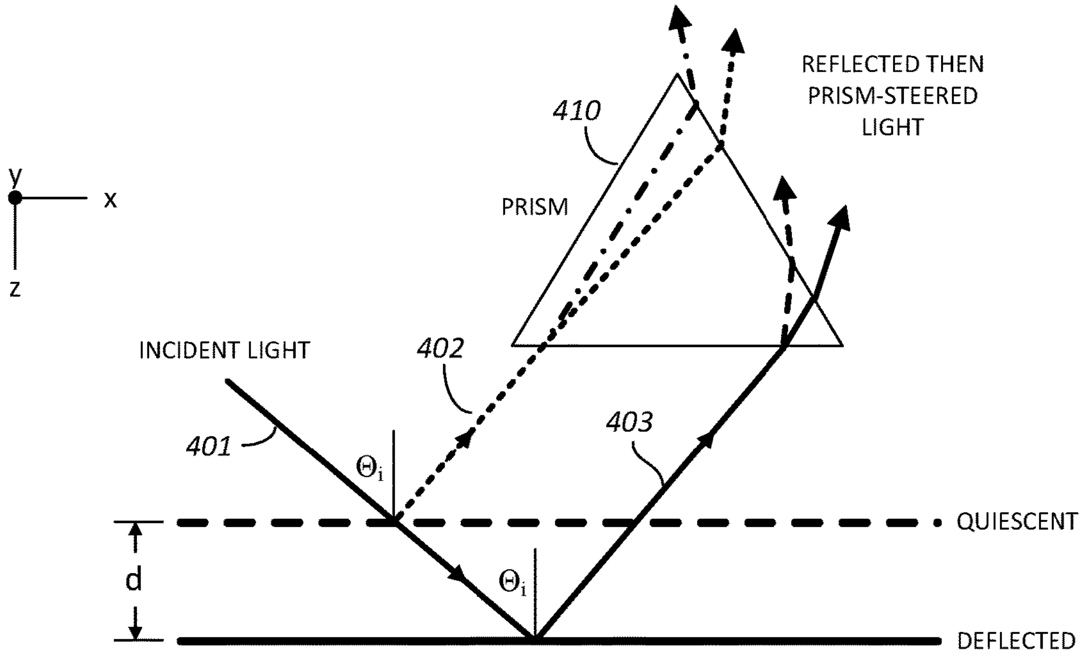
FIG. 9 is a schematic long axis of ribbon view that illustrates usage of a prism as a dispersive element in a MEMS-based SLM in accordance with an embodiment of the present invention.

FIG. 9 is a schematic long axis of ribbon view that illustrates usage of a prism 410 as a dispersive element in a MEMS-based SLM in accordance with an embodiment of the present invention. The prism 410 is fixedly attached in the SLM. In the example of FIG. 9, incoming light (FIG. 9, 401) that is incident on a quiescent ribbon is reflected into the prism 410 (see FIG. 9, 402), and exits the prism 410 at an angle that depends on the wavelength of the light source. Similarly, incoming light (FIG. 9, 401) that is incident on a deflected ribbon is reflected into the prism 410 (see FIG. 9, 403), and exits the prism 410 at an angle that depends on the wavelength of the light source. More particularly, tuning the wavelength of the light source results in steering that is orthogonal to the phased-array axis.

Bulk prisms are capable of providing orthogonal steering as in FIG. 9, but the weak dispersion of most glasses may require much larger dimensions than would be appropriate for use in a MEMS-based SLM. An alternative solution is an engineered dispersive element (e.g., a superprism), which is a specially designed stack of materials that has magnitudes higher dispersion than bulk prisms. Such engineered dispersive element may be incorporated in a scanning system to provide secondary axis steering along with the primary axis steering of the MEMS-based SLM.

The dispersive element may be a separate element that is placed either before or after the phased-array, anywhere within the optical system. For a compact design, the dispersive element may be incorporated into the glass enclosure of the MEMS-based SLM.

Figure 10:
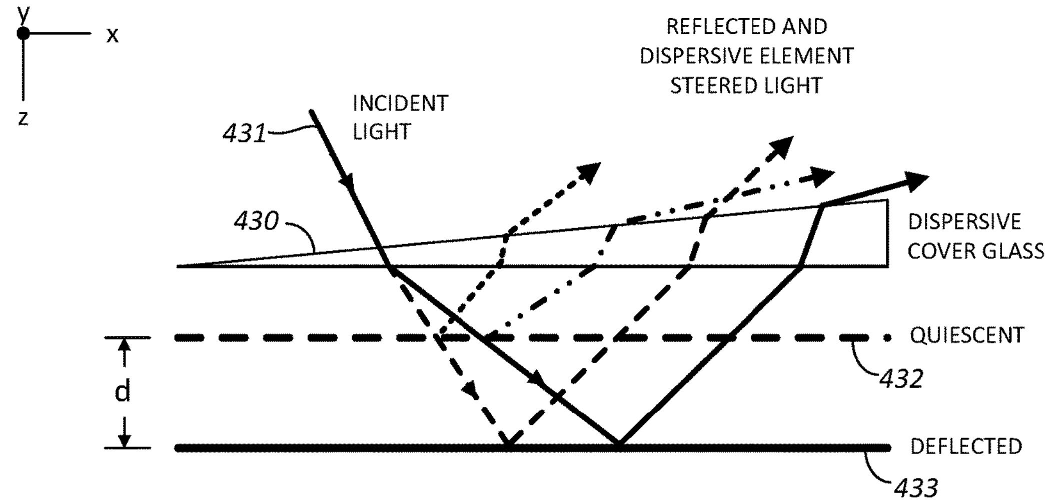
FIG. 10 is a schematic long axis of ribbon view that illustrates usage of a dispersive cover glass in a MEMS-based SLM in accordance with an embodiment of the present invention.

FIG. 10 is a schematic long axis of ribbon view that illustrates usage of a dispersive cover glass 430 in a MEMS-based SLM in accordance with an embodiment of the present invention. In the example of FIG. 10, the dispersive cover glass 430 has a highly dispersive surface. Incoming light (FIG. 10, 431) passes through the dispersive cover glass 430 and is incident on either a quiescent ribbon (FIG. 10, 432) or a deflected ribbon (FIG. 10, 433). In either case, the incident light is reflected by the ribbon back into the dispersive cover glass 430, and exits the dispersive cover glass 430 at an angle that is based on the wavelength of the incident light. That is, the reflected light is steered through the dispersive cover glass 430 by tuning the wavelength of the incident light.

Figure 11:
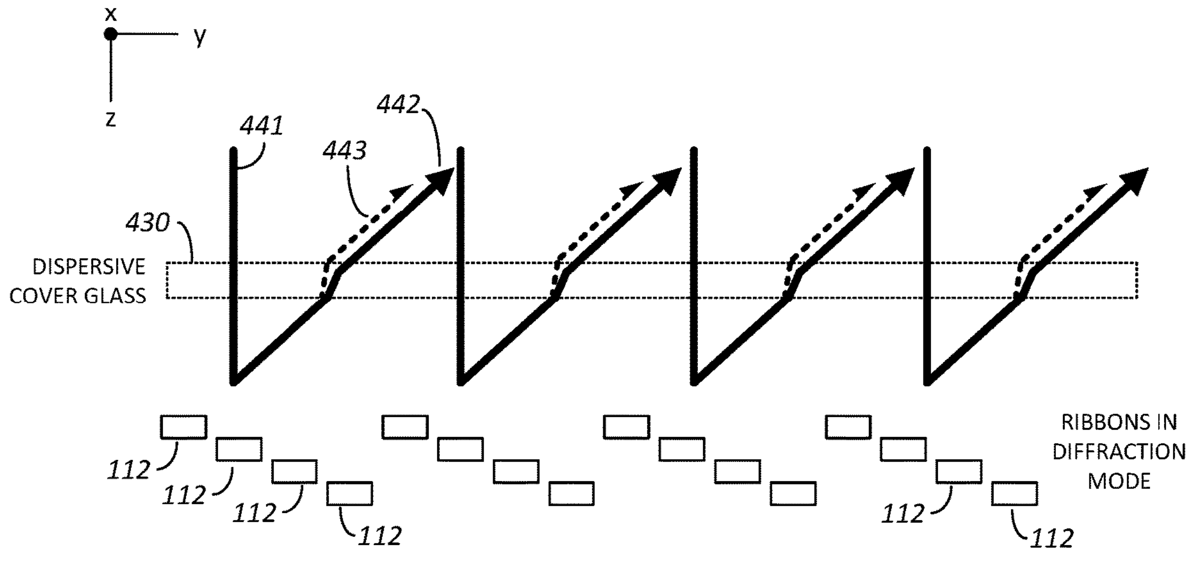
FIG. 11 is a schematic phased-array axis view of the linear phased-array of FIG. 1 with a dispersive cover glass in accordance with an embodiment of the present invention.

FIG. 11 is a schematic phased-array axis view of the phased-array 110 with the dispersive cover glass 430 in accordance with an embodiment of the present invention. FIG. 11 shows groups of ribbons 112 in diffraction mode. Incoming light (FIG. 11, 441) passes through the dispersive cover glass 430 and becomes incident on the ribbons 112. Light reflected off the ribbons 112 enters the dispersive cover glass 430 to exit the SLM. It is to be noted that although the dispersive cover glass 430 may slightly separate the rays of different wavelengths (see FIGS. 11, 442 and 443), the outgoing angle for a given phase ramp slope remains the same.

A dispersive element may be incorporated with a reflecting surface, with the final result being a 2-D scanned spot enabled by a singular mirror-enhanced, dispersive element coated ribbon. The choice between a spot versus a line is determined by examining the trade-off between desired distance and refresh rate. A spot has lower divergence and therefore will have higher power densities to a farther distance but results in slower frame rates or less data compared to a line scan.

Figure 12:
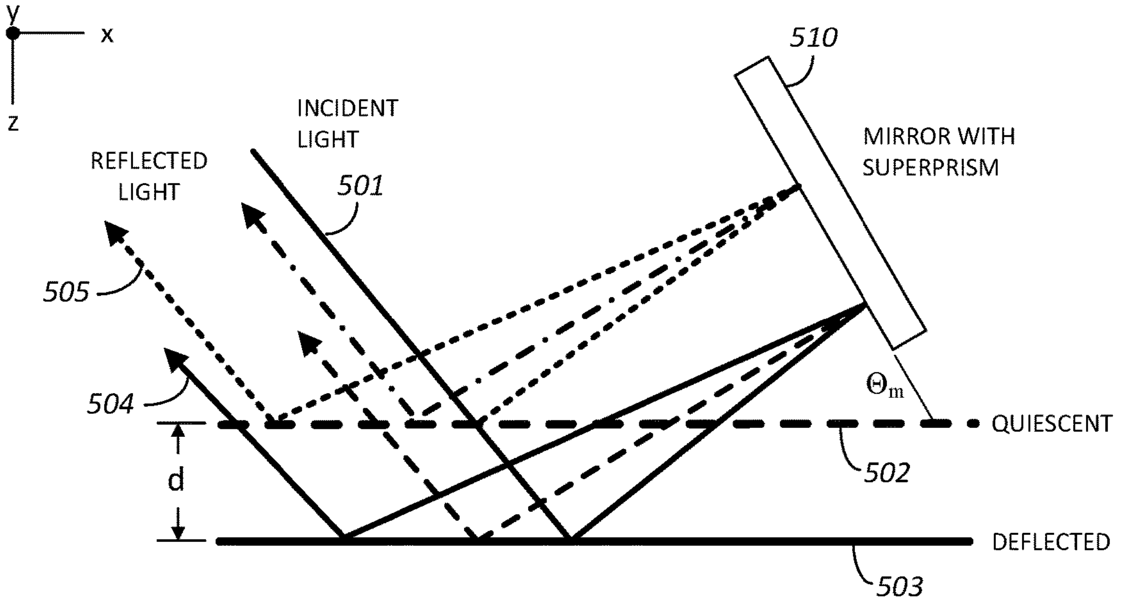
FIG. 12 is a schematic long axis of ribbon view of the linear phased-array of FIG. 1 that operates in conjunction with a mirror and a dispersive element in accordance with an embodiment of the present invention.

FIG. 12 is a schematic long axis of ribbon view of the phased-array 110 that operates in conjunction with a mirror and a dispersive element in accordance with an embodiment of the present invention. In the example of FIG. 12, a dispersive reflector 510 comprises a flat mirror 511 with a superprism 512 (shown in FIG. 13). Incoming light (FIG. 12, 501) that is incident on either a quiescent (FIG. 12, 502) or deflected ribbon (FIG. 12, 503) is reflected toward the dispersive reflector 510, which in turn steers and reflect the light back to the original ribbon to exit the SLM (see FIGS. 12, 504 and 505).

Figure 13:
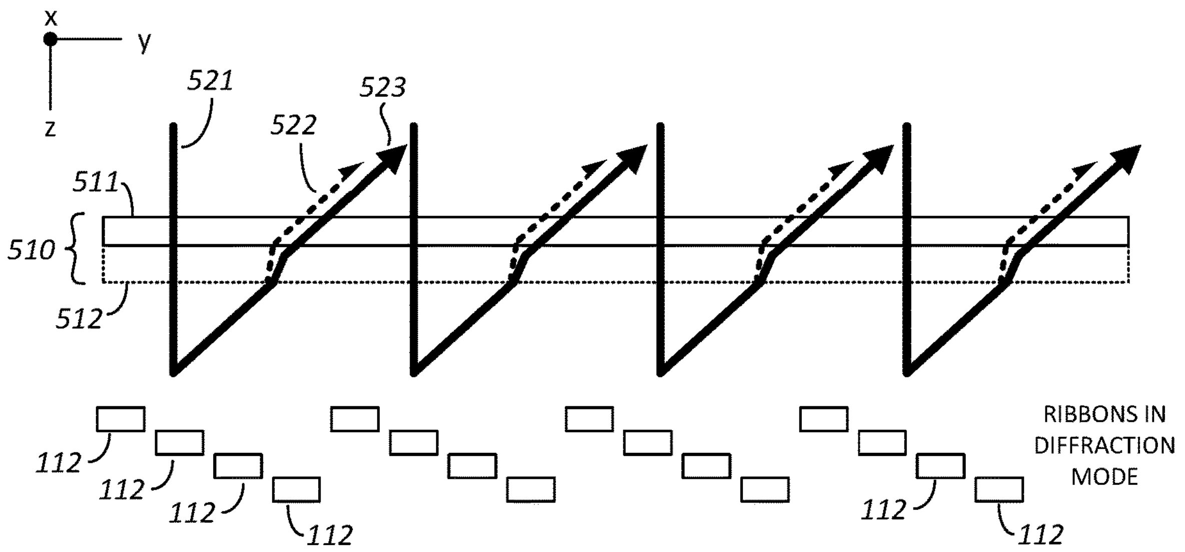
FIG. 13 is a schematic phased-array axis view of the linear phased-array of FIG. 1 with mirror-enhancement and dispersive element in accordance with an embodiment of the present invention.

FIG. 13 is a schematic phased-array axis view of the phased-array 110 with mirror-enhancement and dispersive element in accordance with an embodiment of the present invention. In the example, of FIG. 13, the dispersive reflector 510 is shown as comprising the flat mirror 511 and the superprism 512. The superprism 512 may be placed between the flat mirror 511 and the phased-array 110. Incoming light (FIG. 13, 521) becomes incident on the ribbons 112, and is reflected toward the superprism 512. Outgoing light (FIGS. 13, 522 and 523) exits the superprism 512 at an angle that depends on the wavelength of the incident light. As before, the phased-array axis is not affected by the presence of the dispersive reflector 510.

The phased-array 110 may be used in conjunction with a mirror and/or dispersive element in various optical configurations. The steering of light through the dispersive element and by actuation of the ribbons is the same as previously discussed.

Figure 14:
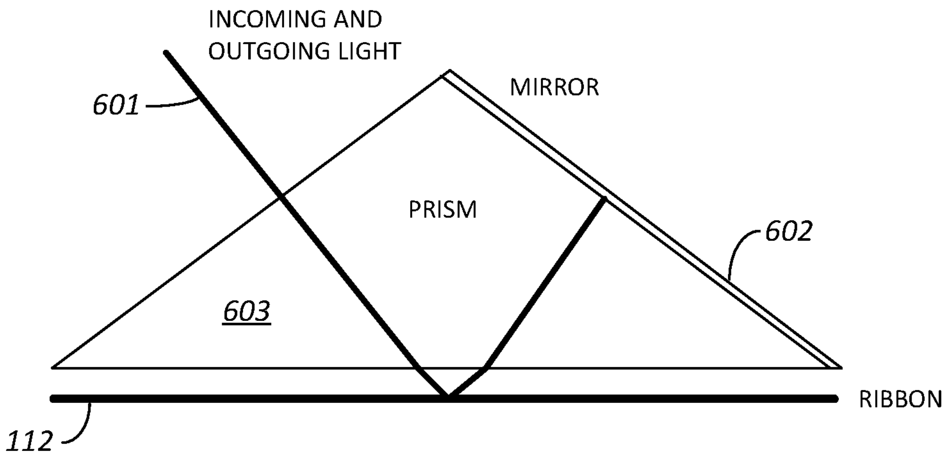
FIG. 14 is a schematic long axis of ribbon view that illustrates the linear phased-array of FIG. 1 used in conjunction with a prism and a flat mirror in accordance with an embodiment of the present invention.

FIG. 14 is a schematic long axis of ribbon view that illustrates the phased-array 110 used in conjunction with a prism 603 and a flat mirror 602 in accordance with an embodiment of the present invention. The flat mirror 602 is disposed directly on a second surface of the prism 603. The prism 603 is a symmetric prism, with the flat mirror 602 breaking the symmetry. The incoming and outgoing light (FIG. 14, 601) are both normal to the first surface of the prism 603. A quiescent or deflected ribbon 112 reflects light to the mirror 602 on the second surface of the prism 603 to increase the travel path of the light as previously explained.

Figure 15:
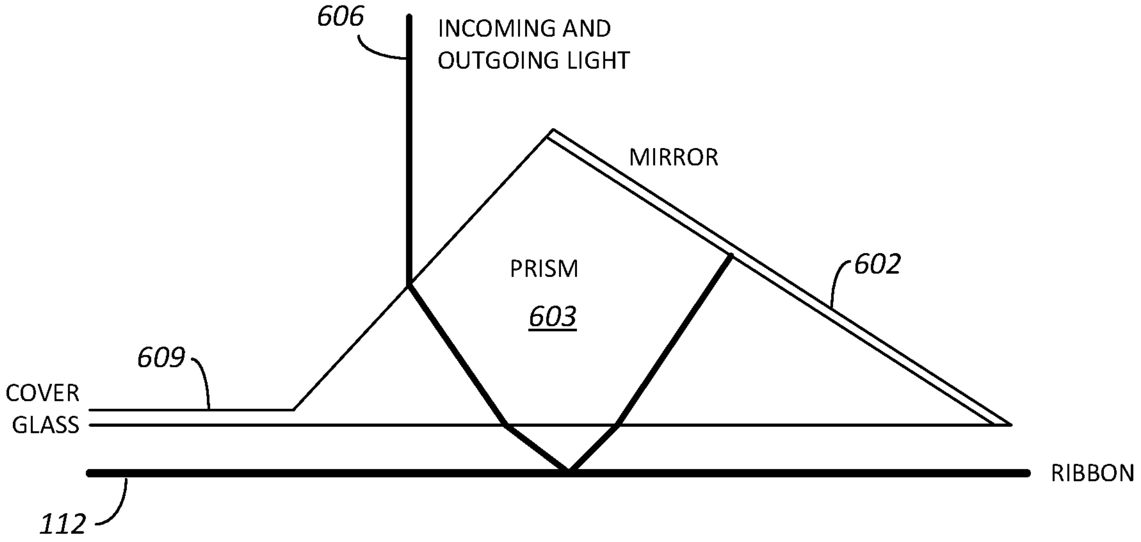
FIG. 15 is a schematic long axis of ribbon view that illustrates the linear phased-array of FIG. 1 used in conjunction with a prism and a flat mirror in accordance with an embodiment of the present invention.

FIG. 15 is a schematic long axis of ribbon view that illustrates the phased-array 110 used in conjunction with the prism 603 and the flat mirror 602 in accordance with an embodiment of the present invention. The optical configuration of FIG. 15 is the same as that of FIG. 14 except the incoming and outgoing light (FIG. 15, 606) are both normal to the reflective surface of a quiescent or deflected ribbon 112. FIG. 15 also shows a cover glass 609 that is not in the optical path of incident light.

Figure 16:
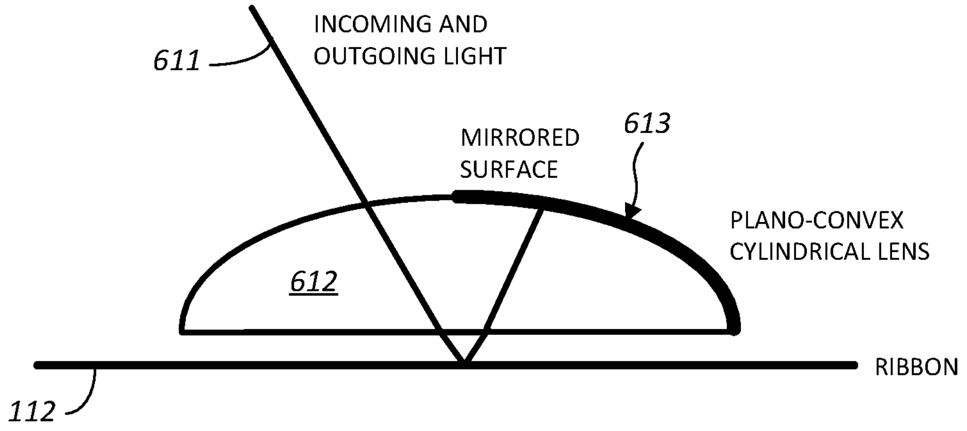
FIG. 16 is a schematic long axis of ribbon view that illustrates the linear phased-array of FIG. 1 used in conjunction with a curved mirror in accordance with an embodiment of the present invention.

FIG. 16 is a schematic long axis of ribbon view that illustrates the phased-array 110 used in conjunction with a curved mirror in accordance with an embodiment of the present invention. In the example of FIG. 16, an outer mirrored-surface 613 of a plano-convex cylindrical lens 612 serves as the mirror. The mirrored-surface 613 may be formed by metallizing the right-side half of the lens 612 for high reflectivity. Incoming and outgoing light (see FIG. 16, 611) passes through the non-metallized surface of the lens 612. A quiescent or deflected ribbon 112 reflects light to the mirrored surface 613 to increase the travel path of the light as previously explained.

Other alternatives to a flat mirror include a retroreflector, such as a corner cube, a 1-D corner cube array, a 2-D corner cube array, or other suitable optics that allow for rays to return directly to the modulation element.

As can be appreciated, the above embodiments may include other optical components to meet the needs of a particular application. Such additional optical components may include: (a) a partially reflective surface, such as a beamsplitter to allow some light to be captured by a detector past the partially reflective surface for reference for FMCW or calibration; (b) a focusing element, such as but not limited to a spherical lens, cylindrical lens, lens array, curved mirrors, in order to adjust the divergence of the beam or otherwise shape the beam; (c) a patterned element, such as but not limited to a faceted mirror, cylindrical array, grating, diffractive optical element or hologram, metasurface, photonic crystal, for patterned reflection, 1-D or 2-D beam formation, or other effects; (d) another or more MEMS-based modulation elements or a scanning mirror, which may be used for secondary axis scanning, patterning, variable focusing, or system correction; (e) a phase conjugating mirror, for phase conjugate reflection; and/or (f) a diffuser, for weak scattering.

The above-embodiments employ a ribbon-type SLM for illustration purposes only. In light of the foregoing, one of ordinary skill in the art can appreciate that planar-type SLMs, such as the Planar Light Valve (PLV) device, may also be employed without detracting from the merits of the present invention.

Briefly, a PLV device has a plurality of addressable pistons as modulation elements. Each piston, which corresponds to a pixel, has a reflective surface. The pistons may be individually actuated, by electrostatic force, to move vertically through a gap. During operation, a piston is deflected downward so that light that is incident on the deflected piston travels farther, creating a phase delay across the deflected piston relative to a quiescent piston. The deflected piston suffers a cosine of angle of incident decrease in phase as in the ribbon-type SLM. Therefore, reflecting light back onto the piston using a mirror confers a $$\frac{1}{\cos(\theta_i)}$$

benefit as well.

Holographic or optimizations algorithms may be employed to compensate for the relatively smaller active area of a piston compared to a ribbon. The phase modulation effect Ø(x, y) of the PLV device may be described as a complex field $U_0(x, y)=e^{jØ(x, y)}$ with input $U_i(x, y)$ with a maximum phase modulation of $Ø_{max}$. An output function $U_{out}(x, y)$ that is the field after reflection to the PLV device and a target far field power distribution $I_{target}(x', y')$ are defined. The optimal phase pattern for a desired target field may be found by using an iterative optimization algorithm to minimize the difference between the target and the magnitude of the Fourier transform $\mathcal{F}$ of the calculated output function:

$$\text{minimize}|I_{target}-|\mathcal{F}(U_{out})|^2|\, s.t.\, U_{out}\sim f(U_0)\measuredangle U_0(x,y)\leq Ø_{max}$$

$$\text{minimize}|I_{target}-|\mathcal{F}(U_{out})|^2|\, s.t.\, U_{out}\sim f(U_0)\measuredangle U_0(x,y)\leq Ø_{max}$$

$$\text{minimize}|I_{target}-|\mathcal{F}(U_{out})|^2|\, s.t.\, U_{out}\sim f(U_0)\measuredangle U_0(x,y)\leq Ø_{max}$$

In the case of the mirror being very close to the surface of the pistons of the PLV device, the output function may be represented as the self-multiplication of the phased-array with a phase tilt due to the difference of the angle of incidence and the angle of reflection:

$$U_{out}\sim(U_0)\times\left(U_0e^{-jkz(\theta_i-\theta_r)}\right)$$

As the mirror is positioned farther away from the surface of the pistons of the PLV device, a near field propagation method or a Fresnel or Fourier transformation may be used on $$\left(U_0e^{-jkz(\theta_i-\theta_r)}\right)$$

in order to represent the field propagation.

Figure 17:
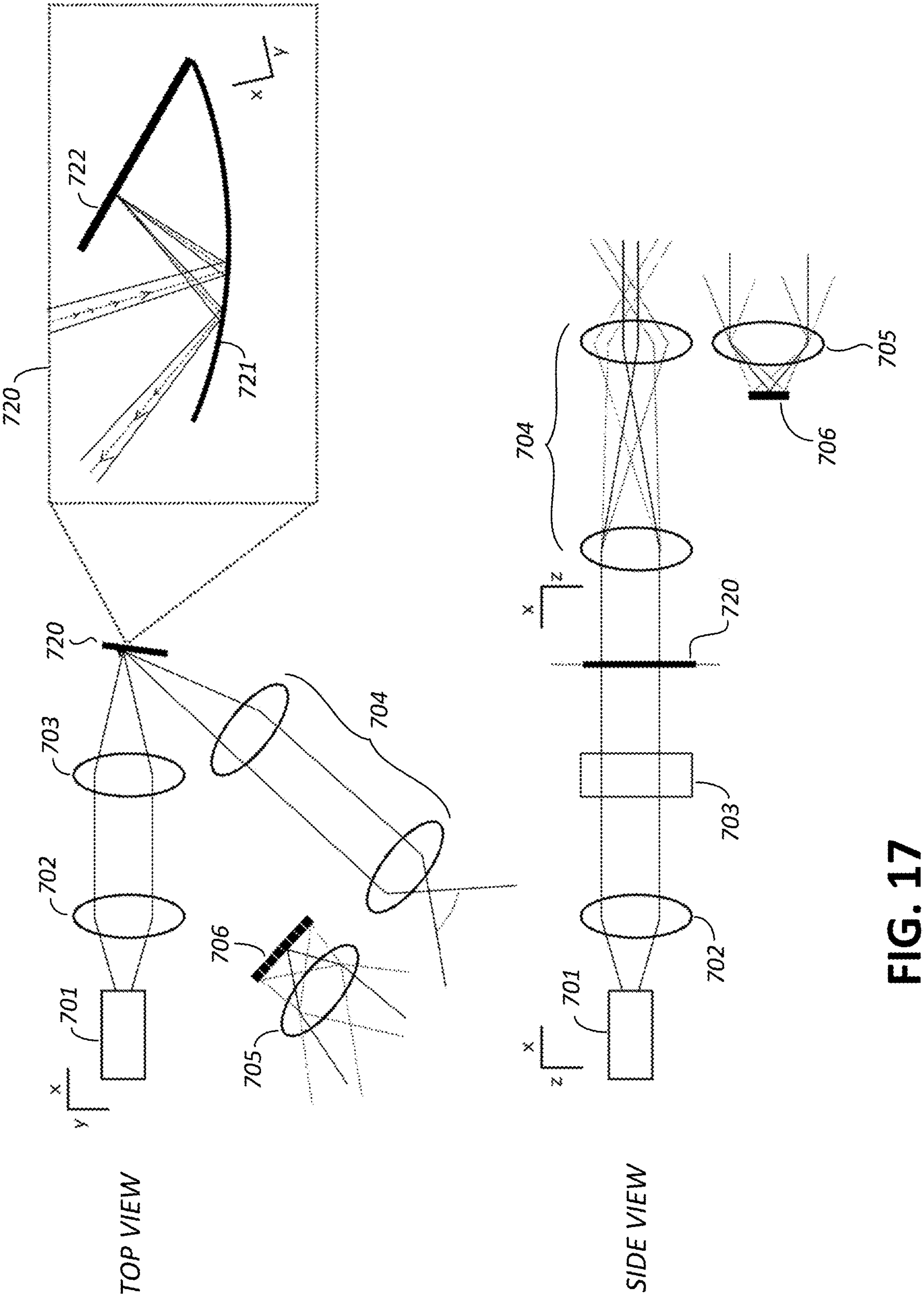
FIG. 17 is a schematic diagram of an optical system for a LIDAR system that incorporates a MEMS-based SLM with mirror enhancement in accordance with an embodiment of the present invention.

FIG. 17 is a schematic diagram of an optical system for a LIDAR system that incorporates a MEMS-based SLM with mirror enhancement in accordance with an embodiment of the present invention. FIG. 17 shows a top view (top of FIG. 17) and a side view (bottom of FIG. 17) of the optical system. For clarity of illustration, the optical light path is shown as being unfolded.

In the example of FIG. 17, a laser source 701 generates a laser beam that is collimated by a collimating lens 702 and then condensed into one dimension by a cylindrical lens 703 onto a mirror-enhanced MEMS-based SLM 720. The SLM 720 comprises a phased-array of modulation elements 721 (e.g., ribbons) and a flat mirror 722. The modulation elements 721 direct the laser beam onto the flat mirror 722, which reflects the laser beam back to the modulation elements 721 for increased travel path as previously explained (e.g., see FIGS. 6-8). Projection optics 704 project the laser beam exiting the SLM 720 as a line beam to a far field scene. An imaging lens 706 images the return line beam onto a detector 706. The detector 706 array may comprise an array of time of flight or FMCW detectors, e.g., single-photon avalanche diode (SPAD) array with timing circuitry commonly used in LIDAR applications.

In the example of FIG. 17, the modulation elements 721 steer the line beam in two dimensions. Vertical discrimination (x-y) is achieved by imaging the line beam onto the detector 706; horizontal (z) discrimination is determined by the steering angle of the phased-array; and depth is measured by time of flight.

Figure 18:
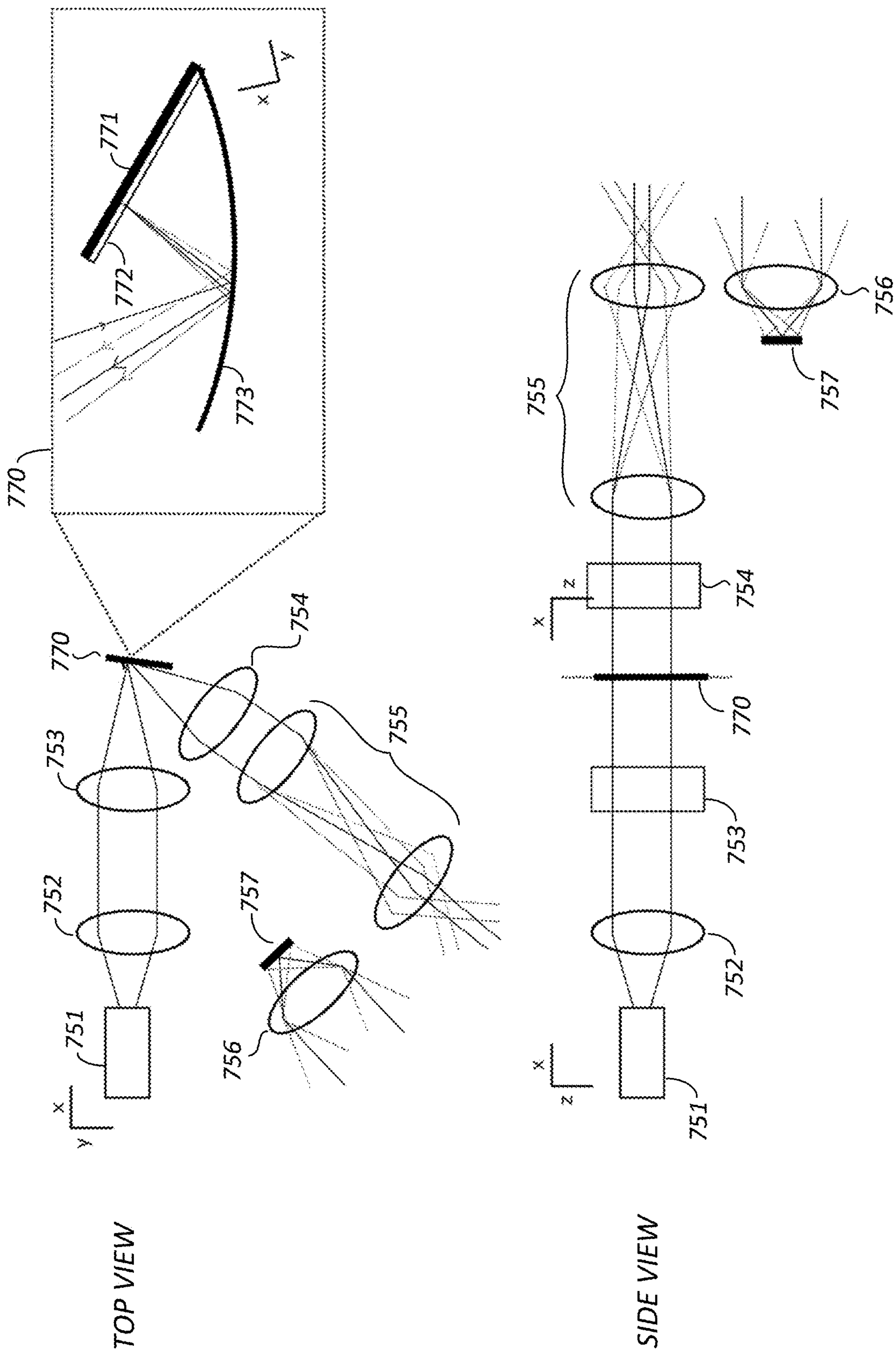
FIG. 18 is a schematic diagram of an optical system for a LIDAR system that incorporates a MEMS-based SLM with mirror enhancement and dispersive element in accordance with an embodiment of the present invention.

FIG. 18 is a schematic diagram of an optical system for a LIDAR system that incorporates a MEMS-based SLM with mirror enhancement and dispersive element in accordance with an embodiment of the present invention. FIG. 18 shows a top view (top of FIG. 18) and a side view (bottom of FIG. 18) of the optical system. The optical light path is shown as being unfolded for clarity of illustration.

In the example of FIG. 18, a laser source 751 generates a laser beam that is collimated by a collimating lens 752 and then condensed into one dimension by a cylindrical lens 753 onto a mirror-enhanced MEMS-based SLM 770 with a dispersive element. The SLM 770 comprises a phased-array of modulation elements 773 (e.g., ribbons), a flat mirror 771, and a dispersive element 772 (e.g., superprism). The modulation elements 773 direct the laser beam onto the flat mirror 771 through the dispersive element 772. The flat mirror 771 reflects the laser beam back onto the modulation elements 7773 for increased travel path, with the dispersive element 772 allowing for changing of the angle of the laser beam exiting the SLM 770 by tuning the wavelength of the laser source 751 as previously explained (e.g., see FIG. 12). A cylindrical lens 754 re-collimates the laser beam exiting the SLM 770 to create a spot beam, which is magnified and projected by the projection optics 755 to a far field scene. An imaging lens 756 images the return spot beam onto a detector 757 for sensing. The detector 757 array may comprise an array of time of flight or FMCW detectors, e.g., SPAD array with timing circuitry. In the example of FIG. 18, primary axis steering is achieved by actuating the modulation elements 773, secondary axis steering is achieved by tuning the wavelength of the laser source 751, and both transverse axes are determined by the scanned angle. Depth is measured by time of flight.

As can be appreciated the optical systems of FIGS. 17 and 18 may be operated in conjunction with a suitable control module (not shown) to meet the needs of a particular LIDAR application without detracting from the merits of the present invention. Such a control module may comprise data acquisition and control electronics, drivers, detectors, etc. and associated firmware/software components as needed by the LIDAR application.

As can be appreciated, the optical systems of FIGS. 17 and 18 are generally applicable to light steering applications other than LIDAR.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of steering light using a microelectromechanical systems (MEMS)-based spatial light modulator (SLM) that comprises a phased-array, the method comprising:

receiving the light into the MEMS-based SLM, the light being incident on a reflective surface of a modulation element of a plurality of modulation elements of the phased-array, the reflective surface being suspended over a gap;

electrostatically actuating the modulation element to deflect the reflective surface vertically and reflect the light toward a mirror;

reflecting the light off the mirror and back toward the same reflective surface of the same modulation element; and reflecting, off the same reflective surface of the same modulation element, the light reflected off the mirror out of the MEMS-based SLM.

2. The method of claim 1, wherein electrostatically actuating the modulation element to deflect the reflective surface vertically and reflect the light toward the mirror comprises:

applying a voltage between an electrode that is coupled to the reflective surface and a base electrode that is on or in a substrate of the phased-array.

3. The method of claim 1, wherein the MEMS-based SLM is a ribbon-type SLM or a planar-type SLM.

4. The method of claim 1, further comprising:

passing the light through a dispersive element that is disposed between the mirror and the phased-array.

5. The method of claim 4, further comprising:

steering the light through the dispersive element by tuning a wavelength of the light.

6. The method of claim 5, wherein the dispersive element is a prism.

* * * * *